United States Patent [19]
Packer et al.

[11] Patent Number: 6,115,357
[45] Date of Patent: Sep. 5, 2000

[54] METHOD FOR PACING DATA FLOW IN A PACKET-BASED NETWORK

[75] Inventors: Robert L. Packer, Los Gatos; Brett D. Galloway, Campbell, both of Calif.

[73] Assignee: Packeteer, Inc., Cupertino, Calif.

[21] Appl. No.: 09/106,924

[22] Filed: Jun. 29, 1998

Related U.S. Application Data

[60] Provisional application No. 60/051,387, Jul. 1, 1997.

[51] Int. Cl.[7] .................................................. H04L 12/56
[52] U.S. Cl. .......................... 370/231; 370/235; 370/252
[58] Field of Search ..................................... 370/519, 389, 370/231, 235, 229, 230, 232, 233, 234, 236–238; 709/232, 233, 234, 235

[56] References Cited

U.S. PATENT DOCUMENTS

| | | | |
|---|---|---|---|
| 5,063,562 | 11/1991 | Barzilai et al. | |
| 5,491,691 | 2/1996 | Shtayer . | |
| 5,748,613 | 5/1998 | Kilk et al. | 370/231 |
| 5,764,625 | 6/1998 | Bournas | 370/229 |
| 5,787,071 | 7/1998 | Basso et al. | 370/231 |
| 5,870,398 | 2/1999 | Kotchey | 370/445 |
| 5,918,020 | 6/1999 | Blackard et al. | 395/200.58 |
| 5,959,973 | 9/1999 | Meurisse et al. | 370/232 |
| 5,978,384 | 11/1999 | Kotchey | 370/445 |

FOREIGN PATENT DOCUMENTS

| | | |
|---|---|---|
| 0 415 843 | 3/1991 | European Pat. Off. . |
| 0 458 033 | 11/1991 | European Pat. Off. . |

OTHER PUBLICATIONS

Chen et al., "Hop–By–Hop Flow Control on Unreliable Connections," *Communications–Sound to Light*, Seattle, Jun. 7–10, 1987, 3:1683–1687, Jul. 7, 1987 XP002036563.
Jacobson, "Congestion Avoidance and Control," *Computer Communication Review*, vol. 25, No. 1, pp 158–173, XP000512249, January 1995.

*Primary Examiner*—Douglas W. Olms
*Assistant Examiner*—Kon Vanderpuye
*Attorney, Agent, or Firm*—Townsend and Townsend and Crew LLP; Kenneth R. Allen

[57] ABSTRACT

A method for pacing data flows in packet switched networks by arranging data transmission over a period of time based upon a set of ascertainable factors about the underlying transmission link to derive an intersegment transmission interval. The intersegment transmission interval can be used to pace either data packets or acknowledgment packets. The method is especially useful for pacing the transmission of data in a digital data packet communication environment having a plurality of digital packet transmission stations inter-connectable in a data path and employing the Transmission Control Protocol (TCP) suite.

18 Claims, 4 Drawing Sheets

Legend

88  Session/Application Layer

86  Transport Layer

84  Network Layer

82  Data Link Layer

80  Physical Layer

METHOD FOR PACING DATA FLOW IN A PACKET-BASED NETWORK

CROSS-REFERENCE TO RELATED APPLICATIONS

This application claims priority from the following U.S. Provisional Application, the disclosure of which including all appendices and all attached documents is incorporated herein by reference in its entirety for all purposes:

U.S. Provisional Patent Application Ser. No. 60/051,387 in the name of Robert L. Packer and Brett D. Galloway, entitled, "A Method for Pacing Data Flow in a Network Employing a TCP/IP Protocol Suite", filed Jul. 1, 1997.

Further, this application makes reference to the following commonly owned U.S. patent applications, which are incorporated herein by reference in their entirety for all purposes:

U.S. patent application Ser. No. 08/762,828, now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;" and U.S. patent application Ser. No. 08/742,994 now U.S. Pat. No. 6,038,216, in the name of Robert L. Packer, entitled "Method for Explicit Data Rate Control in a Packet Communication Environment Without a Data Rate Supervision."

BACKGROUND OF THE INVENTION

The present invention relates to digital packet transmission, and particularly to methods for pacing transmissions of data within time intervals that are based on criteria ascertainable from the characteristics of the underlying transmission infrastructure. Embodiments according to the present invention are particularly useful in conjunction with data flow rate detection and control of a digitally-switched packet telecommunications environment that is not subject to explicit data flow rate control.

The ubiquitous TCP/IP protocol suite implements the world wide data communication network environment called the Internet and is also used in private networks (e.g., Intranets). TCP is the transport level transmission Control Protocol and IP is the network level Internet Protocol. At the network level, IP provides a datagram delivery service. At the transport level built on top of the datagram deliver service, TCP provides guaranteed sequential delivery of a data stream between two hosts operating with IP protocol.

TCP provides for a reliable session-based service for delivery of sequenced packets of information across the Internet. One method employed to provide this reliable service is a system of acknowledgments for data received at each endpoint. However. data segments and acknowledgments can be lost. To address this problem, TCP uses a retransmission timeout (RTO) mechanism. Under the RTO mechanism, TCP manages a retransmission timer for each connection. After an endpoint sends data, it expects acknowledgment from the receiving endpoint. TCP sets the retransmission timer and tracks an RTO value and a round trip time (RTT) for the connection. A round trip time is the time elapsed between the start of transmission of a TCP-type data segment and the receipt of an acknowledgement of that segment. If an acknowledgment is not received by the time the retransmission timer expires, a transmission loss is inferred and TCP retransmits the data.

Other terms used hereinafter are defined as follows.

A TCP connection is a well-understood communication mode in which two end users of the TCP protocol are able to be guaranteed that the exchanged data is in sequence and accurate at the end-user level, even though the TCP connections may not have received the data in sequence or accurately.

Transmission delay is the amount of time required to serialize the bits on the transmission media, and does not include propagation delay or queueing delay.

A window transmission time (WTT) is the time required to transmit a TCP flow control window's worth of data, where the "time required to transmit" is equal to the transmit delay.

A "segment" is a transport PDU (protocol data unit), such as in TCP, encapsulated within a network "packet."

The number of segments in a flow control window (NSW) is the size of the TCP flow control window (in bytes) divided by the maximum segment size (MSS) (in bytes) as defined by the TCP protocol.

Aside from the system of acknowledgements, the TCP/IP protocol intentionally omits explicit supervisory function over the rate of data transport over the various media that make up the network. While there are certain perceived advantages, this characteristic has the consequence of juxtaposing very high-speed packet flows and very low-speed packet flows in potential conflict for network resources, which results in inefficiencies. At the extreme, certain pathological loading conditions can result in instability, overloading, and data transfer stoppage. The loading conditions can be created by processes that generate traffic in bursts of data packets called "packet trains."

TCP "flow control" mechanisms attempt to alleviate the loading conditions by limiting the rate at which a TCP endpoint can emit data. A "flow", as used in the context of TCP/IP network traffic, is defined as traffic between a specific pair of IP host/port addresses (e.g., a TCP connection or a UDP session). A basic flow control mechanism in TCP is a "sliding window" that limits the amount of unacknowledged transmit data that a transmitter can emit. Another flow control mechanism is a "congestion window" (which is a refinement of the sliding window) that involves a conservative expansion to make use of the full, allowable window. A component of this mechanism is sometimes referred to as "slow start". These window flow control mechanisms work in conjunction with the retransmit timeout mechanism described above to provide a limited level of end-to-end data flow rate control. However, these mechanisms do not provide explicit rate control of data flow in any particular connection in the network.

TCP "congestion control" is another mechanism that is related to "flow control". Congestion control in TCP/IP networks is accomplished by a combination of TCP end systems and routers that queue and discard packets when a certain congestion threshold is exceeded. Packet discarding serves as a feedback mechanism to a TCP transmitter to indicate that congestion exists. One disadvantage of this feedback mechanism is the possibly large and uneven delays that may be perceptible to interactive users at the TCP end systems.

Besides providing congestion control, routers typically support various queuing methods intended to provide fairness and a rough ability to partition and prioritize separate classes of data traffic. An increasingly common method of queuing implemented in access-link routers, interior routers, and ATM backbone equipment is the "Fair Queuing" technique. In Fair Queuing, when the number buffered packets pending transmission reaches a predetermined congestion threshold, packets are discarded on the basis of whether or not other packet(s) is already buffered for the specific flow associated with those packets. Fair Queuing beneficially limits flows that may have high bandwidth demands when a router becomes congested. However, Fair Queuing also implicitly (and unintendedly) has a tendency to discard packets for flows that emit packets in a "bursty" fashion (i.e., packet trains, as described below). Bursty traffic is generally characterized by long period of inactivity punctuated by a large burst of data traffic. "Bursty" packets affect the conventional congestion and flow control mechanisms. As packet trains traverse through the network, they induce queuing in a way that increases the probability of packet loss in routers using Fair Queuing mechanisms, resulting in undesired inefficiencies due to the discarding of packets. Packet loss subsequently causes a retransmission timeout and retransmission of another packet train, which results in further inefficiencies and adds to the congestion control problem.

Therefore, it is desirable to provide a mechanism to increase efficiency of data transfer while reducing the risk of data loss of bursty packet traffic.

SUMMARY OF THE INVENTION

According to the invention, in a packet switched network, the frequency of data transmissions during a window transmission time (WTT) is arranged based upon a set of ascertainable factors about the underlying transmission link so that data flow can be paced. Specifically, calculated interpacket time intervals are inserted among bursts of packets. The interpacket transmission intervals are used to pace either the transmission of data packets or the transmission of acknowledgment packets. According to an embodiment of the present invention in a TCP/IP environment, packets are paced according to window transmission time (WTT), round trip time (RTT) and number of segments in a flow control window (NSW) and specifically according to the following relation:

$$ITI=(RTT-WTT)/(NSW-1)$$

where an ITI is the intersegment transmission interval (an elapsed time); and RTT>WTT and NSW>1.

This embodiment is especially useful for pacing transmission of data in a digital data packet communication environment having a plurality of digital packet transmission stations inter-connectable in a data path employing the Transmission Control Protocol (TCP) suite.

In another embodiment, data flow pacing by the insertion of interpacket gaps can be accomplished by placing a predetermined rate limit on the data flows. This technique is especially useful for pacing packet trains that may arise from sources other than a windowed flow control protocol, or sources that emit large bursts of packets. This technique is also suited for a windowed flow control protocol where the RTT is less than the WTT, a window's worth of packets.

In yet another embodiment, pacing by the insertion of interpacket gaps, i.e., intersegment time intervals (ITI) can also be accomplished by controlling the acknowledgement process. For example, a device can be interposed between a sender and a receiver in the network. This device controls the rate and scope of acknowledgment (ACK) packets so that data is paced in the network.

The interpacket gap insertion-type data flow pacing techniques according to the invention can be combined with other transmission techniques in select embodiments. For example, in various alternative embodiments, data flow pacing techniques can be combined with techniques for automatic scheduling of packets for transmission, techniques for providing rate control (i.e., using acknowledgements), techniques for reducing unnecessary retransmissions as well as various other techniques.

Some embodiments according to the present invention can provide improved link efficiency. Certain embodiments according to the present invention may reduce queuing delay. Many embodiments according to the invention can reduce network congestion and prevent packet loss.

The invention will be better understood upon reference to the following detailed description and its accompanying drawings.

DESCRIPTION OF SPECIFIC EMBODIMENTS

Introduction

The present invention provides techniques to manage network bandwidth, such as on a transmission link between a local area network (LAN) and a wide area network (WAN), by controlling the introduction of packets onto the transmission link. More specifically, the invention involves techniques for introducing interpacket delays in bursty-type packet transmissions, and in particular in TCP/IP protocol environments.

Network Overview

Figure 1:
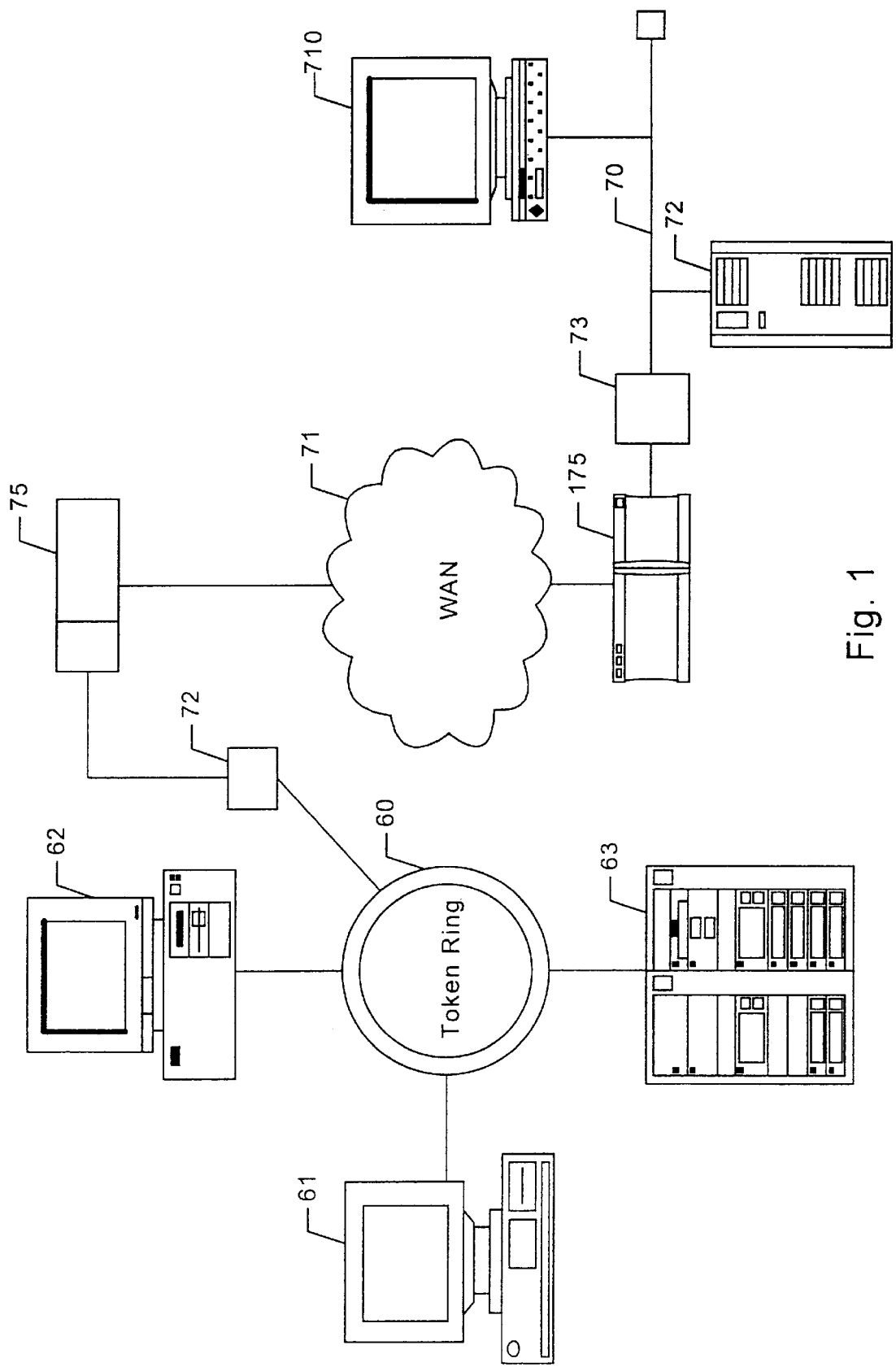
FIG. 1 depicts a representative inter-network having a plurality of clients and a plurality of servers that process data flows.

FIG. 1 depicts an inter-network of a plurality of clients and a plurality of servers that process data flows through a wide area network (WAN). The clients and servers are described below. In FIG. 1, first network 60 is shown as a Token Ring or a frame oriented network, although other networks can also be used. Network 60 links together hosts 61, 62, and 63. Hosts 61, 62, and 63 can generally be any computer running any operating system. Network 60 is inter-networked to a wide area network 71 through a first router 75 and a second router 175 to a second network 70. The system gateway of routers 175 and 75 can also include a firewall, a network bridge, and other features not relevant to the invention but important to operation. Network 70 (shown in FIG. 1 as an Ethernet network) links hosts 71 and 72. Hosts 71 and 72 can also be any computer running any operating system.

Router 75 is a network access point (NAP) of networks 60 and 70. As shown in FIG. 1, router 75 employs a Token Ring adapter and an Ethernet adapter. This enables router 75 to interface with the two heterogeneous networks 60 and 70.

The present invention can be practiced in a client-server environment, but the client-server environment is not essential. In a specific embodiment, the subject invention dwells in bridges 72, 73 between each of the networks 60 and 70 and each of the routers 75, 175. However, the elements may reside in the end systems, in the routers or in the links between the routers and the WAN. In general, the invention can be placed wherever the traffic can be paced. The term "server," as used herein, refers to a unit that performs one or more of the following functions: receiving queries from (typically, remote) clients, performing processing necessary to formulate responses to the queries, providing these responses to the clients, and performing other necessary tasks. A server may also act in the capacity of a client for a response (i.e., when it accesses remote databases located at another node) while it acts as a server for another response (i.e., when acting as a database server).

Transmission Delay and RTT Determination

The pacing of data flows is based, in part, on (1) transmission delay and (2) RTT. The transmission delay and RTT of a link can be determined by numerous methods. A technique for automatically determining the transmission delay and RTT of a TCP connection is disclosed in the aforementioned co-pending U.S. patent application Ser. No. 08/762,828 filed Dec. 6, 1996, now U.S. Pat. No. 5,802,106, which is incorporated herein by reference.

Data Flow Pacing

Figures 2A, 2B:
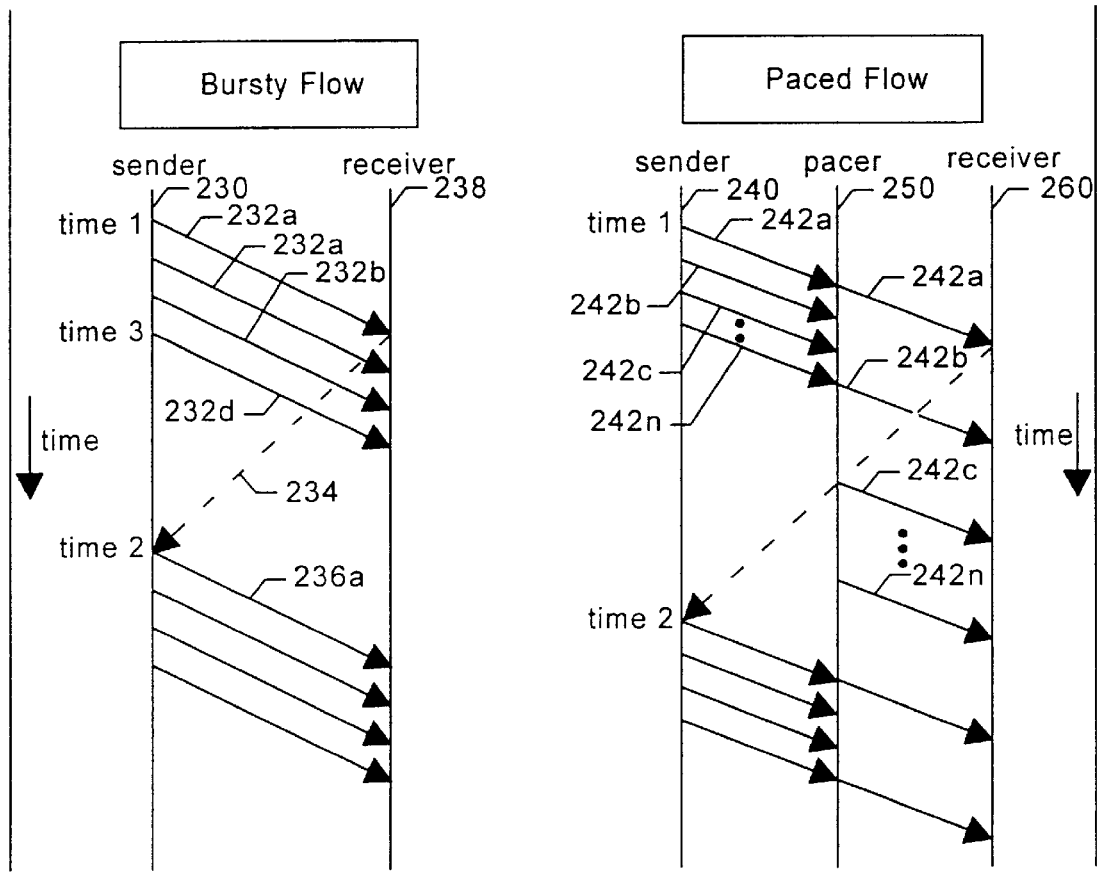
FIG. 2A depicts a representative conventional unpaced bursty packet data flow.
FIG. 2B depicts a representative paced bursty packet data flow according to a particular embodiment wherein a window's worth of packets is paced over the flow's RTT.

FIG. 2A depicts a conventional unpaced data flow. In conventional sliding window protocols (i.e., as defined by TCP), transmission of a window of segments within individual flows are compressed in the front of the flow's RTT where RTT>WTT, A sender 230 transmits packets 232 each containing a segment, as capacity becomes available on the transmission link, being at time 1 and ending at time 3, to a receiver 238. Upon receipt of the first packet 232a, receiver 238 sends an acknowledgement packet 234 back to sender 230, which is received at time 2. The round trip time (RTT) is defined as the time between receipt of acknowledgement packet 234 (Time 2) and the time of transmission of the first packet 232a (Time 1) (or RTT=Time2−Time1). The window transmission time (WTT) is defined as the time between the beginning of transmission of the first packet 232a (Time 1) and the end of transmission of the last packet 232d (Time 3) (or WTT=Time3−Time1). Typically, the subsequent transmission of data segments 236, i.e., the next window, is not transmitted until acknowledgement packet 234 is received.

The pacing of packet trains of an entire RTT of a particular flow in the present invention involves spacing out a window's worth of packets over an entire RTT. The data flow pacing of the present invention can be implemented by various embodiments, some of which are described below. However, modifications and additions to the embodiments described below are also within the scope of the present invention.

Pacing Based upon Round Trip Time (RTT)

FIG. 2B depicts a packet flow in a representative client server connection in an embodiment wherein a window's worth of packets is spaced out over the flow's RTT. As shown in FIG. 2B, data flow pacing is accomplished by an intermediate pacer 250 based on the RTT value that is computed using one of the embodiments discussed above. The implementation of pacer 250 is described below. Initially, pacer 250 receives a first packet 242a from sender 240 and transmits this packet 244a to a receiver 260. Upon receiving additional packets 242b through 242n, pacer 250 determines the number of packets to be transmitted and the remaining time within the present RTT interval.

In one embodiment according to the invention, the remaining packets 242b through 242n are transmitted by pacer 250 at approximately "equally" spaced time intervals, as shown in FIG. 2B. Pacer 250 determines the number of packets to be transmitted and the remaining time left in this RTT interval. Pacer 250 then divides the remaining time into the number of packets to obtain a time interval according to the formula $$ITI=(RTT-WTT)/(NSW-1)$$

where an ITI is the intersegment transmission interval (an elapsed time); and $$RTT>WTT \text{ and } NSW>1.$$

One packet is then transmitted at each interval. This embodiment results in the transmission of the burst of packets received at Time1 over the RTT link.

A variety of embodiments based upon these techniques can be realized without departing from the scope of the present invention. For example, in certain embodiments, the RTT can be updated continually or periodically as additional information about the state of the network is learned. The time interval can then be recomputed accordingly. In other embodiments, two or more packets can be transmitted within each time interval (and the time interval can be increased accordingly). Generally. any number of packets can be transmitted within a time interval having any duration. Furthermore, the packet transmissions can be spaced evenly or randomly within the time interval. Random spacing would decrease autocorrelation effects and decrease queuing delay, thus reducing end-to-end delay.

Figure 3:
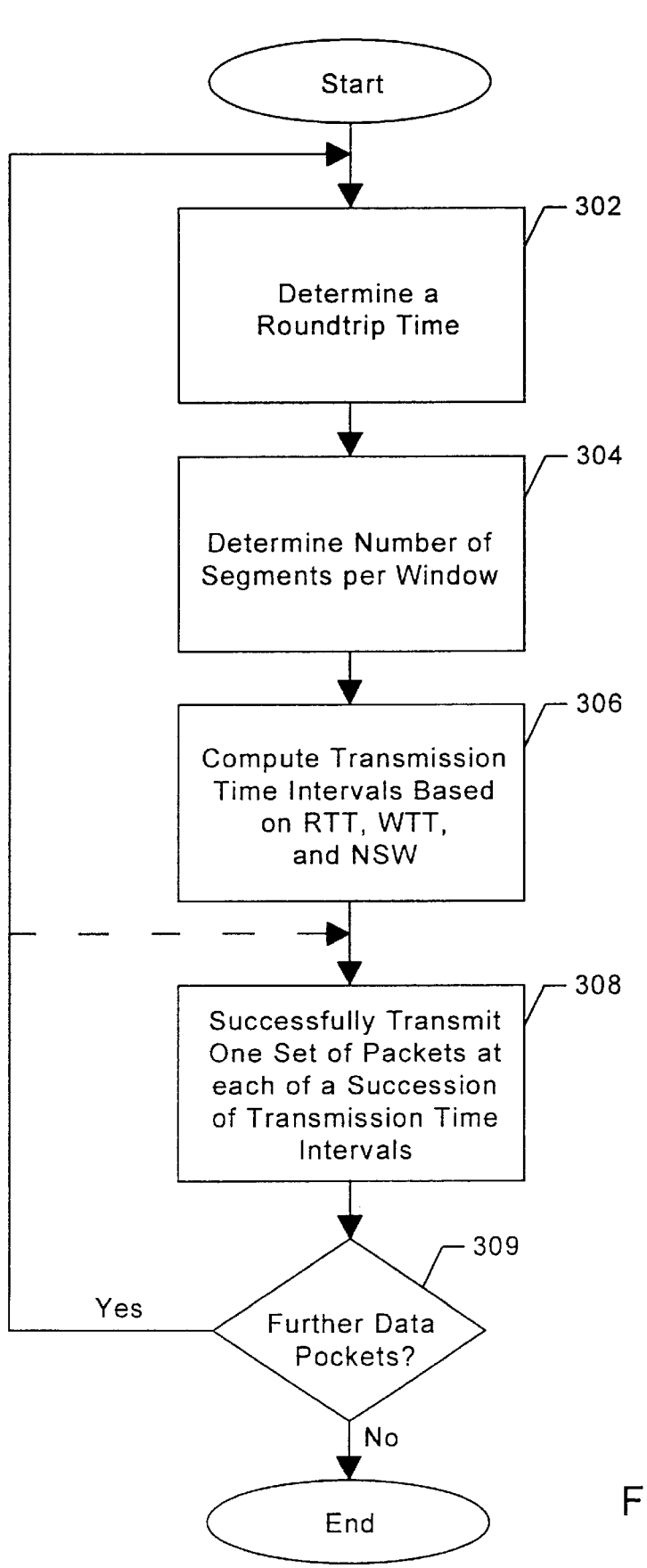
FIG. 3 depicts a key operation according to the invention.

Pacer 250 can be designed to receive the burst of packets, buffer the packets, and transmit packets at selected times. Pacer 250 can be implemented as a stand-alone unit or incorporated within the design of the sender. Select embodiments realize Pacer 250 using a processor, a microcontroller, an application specific integrated circuit (ASIC), a programmable device, or any other device designed and operated to provide the functionality described herein. A flow chart of a key operation of the pacer 250 is shown in FIG. 3, as hereinafter explained.

Pacing Based upon Round Trip Time (RTT)

In one embodiment of the pacer 250, RTT many be estimated by round trip delay, as for example taught in the aforementioned patent application. FIG. 3 depicts a representative flowchart 301 of process steps that may be included in many embodiments according to the method for pacing transmission of data of the present invention. In a step 302, a round trip time (RTT) value is determined. Next, in a step 304, the number of segments in a window is determined. Then, in a step 306, interpacket gaps or intersegment transmission time intervals are computed, typically according to the formula herein above based on RTT, WTT and NSW. In a step 308, the interpacket gap is inserted between each one or selected packets in the window as each one of the packets is transmitted, as illustrated in FIG. 2B. If upon testing (Step 309) there are further packets, the process is repeated, either from the beginning of the determination of the roundtrip time or from the beginning of step 308; otherwise the process ends. The round trip time may typically be determined only once per connection. However, all values could be computed more frequently if it is found that the round trip time or the window transmission time or the number of segments per window vary during a connection for any reason of design or environmental conditions.

Pacing Based upon Predetermined Rate Limit

In another embodiment, pacing can be accomplished by placing a predetermined rate limit on the data flows. This technique is especially useful for packet trains that may arise from sources other than a windowed flow control protocol or sources that emit large burst of packets. This technique is also suited for a windowed flow control protocol where the RTT is shorter than the time required to transmit a window's worth of packets, thereby necessitating the need to buffer, discard, or limit the transmission of some of the packets.

The relation between the arbitrary rate limit and the determination of ITI is as follows:

The arbitrary rate limit is used to derive an effective RTT using the formula: (AR)=(WB)/(RTT), where (AR) is Arbitrary Rate, (WB) is the number of bits in a flow control window or Window Bits and (RTT) is as defined as round trip time. Hence, RTT in seconds is (WB)/(AR). For example for an arbitrary rate of 32K bps with a window of 8KBytes or 64Kbits, the RTT to be used for calculation is 2 seconds.

In still another embodiment using this technique, each sender sends the burst of packets to an intermediate pacer, similar to pacer 250 in the above embodiment. The pacer 250 then determines the number of packets that can be transmitted within the current RTT interval or even an arbitrary interval. The pacer 250 then transmits the packets in one of the manners described above.

Pacing Based upon Control of Acknowledgement Packets

In yet another embodiment, pacing can also be accomplished by controlling the TCP acknowledgement process. For example, a rate control device can be interposed between the sender and the receiver. This device controls the rate and scope of acknowledgment (ACK) packets in the manner described in detail in the aforementioned co-pending U.S. patent application Ser. No. 08/762,828. By controlling the rate of acknowledgments, there is explicit control of the intervals in which a transmitter receives acknowledgments, i.e., the roundtrip time for each acknowledgment is explicitly controlled.

Additional Embodiments

Additional embodiments can incorporate select data flow pacing techniques described above for improved performance. For example, techniques for automatic scheduling of TCP packets for transmission can be coupled with data flow pacing techniques to maximize usage, reduce transmission delay, and reduce congestion on the transmission medium. A technique for automatically scheduling TCP packets for transmission is disclosed in the aforementioned co-pending U.S. patent application Ser. No. 08/742,994.

As another example, techniques for providing TCP rate control (i.e., using acknowledgements) can also be coupled with data flow pacing techniques to improve efficiency and reduce congestion.

Layers of TCP/IP Protocol

Figure 4:
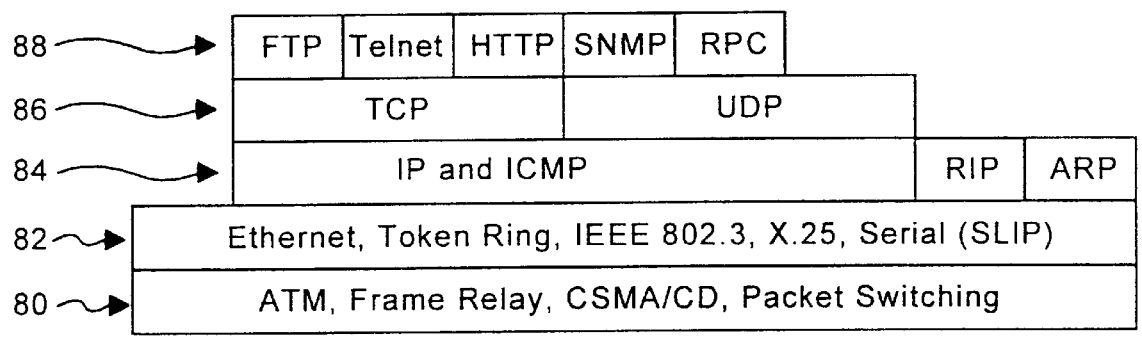
FIG. 4 depicts the various layers that make up the Transmission Control Protocol/Internet Protocol (TCP/IP) suite.

FIG. 4 depicts the various layers that make up the Transmission Control Protocol/Internet Protocol (TCP/IP) suite. A physical layer 80 is the base layer of the TCP/IP suite that defines the mechanical, electrical, functional, and procedural standards for the physical transmission of data over communications media, (e.g., a network connection). Physical layer 80 can include electrical, mechanical, and functional standards. The functional standards can indicate whether a network is (1) packet switching or frame-switching, and (2) based on a Carrier Sense Multiple Access/Collision Detection (CSMA/CD) or a frame relay paradigm.

A data link layer 82 overlies physical layer 80. Data link layer 82 provides the functions and protocols to transfer data between network resources and to detect errors that may occur at the physical layer. Operating modes at data link layer 82 include such standardized network topologies as IEEE 802.3 Ethernet, IEEE 802.5 Token Ring, ITU X.25, or serial (SLIP) protocols.

Network layer protocols 84 overlay data link layer 82 and provide the means for establishing connections between networks. The standards of network layer protocols provide operational control procedures for internetworking communications and routing information through multiple heterogeneous networks. Examples of network layer protocols are the Internet Protocol (IP) and the Internet Control Message Protocol (ICMP). The Address Resolution Protocol (ARP) is used to correlate an Internet address and a Media Access (MAC) address for a particular host. The Routing Information Protocol (RIP) is a dynamic routing protocol for passing routing information between hosts on networks. The ICMP is an internal protocol for passing control messages between hosts on various networks. ICMP messages provide feedback about events in the network environment or can help determine if a path exists to a particular host in the network environment. The latter is called a "Ping". IP provides the basic mechanism for routing packets of information in the Internet. IP is a non-reliable communication protocol that provides a "best efforts" delivery service. IP does not commit network resources to a particular transaction, perform retransmissions, nor give acknowledgments.

Transport layer protocols 86 provide end-to-end transport services across multiple heterogeneous networks. A User Datagram Protocol (UDI)) provides a connectionless, datagram oriented service that provides a non-reliable delivery mechanism for streams of information. TCP provides a reliable session-based service for delivery of sequenced packets of information across the Internet. TCP provides a connection oriented reliable mechanism for information delivery.

Conclusion

The present invention provides methods for pacing data packet transmissions in data packet based telecommunications systems. The previous description of the specific embodiments is provided to enable any person skilled in the art to make or use the present invention. The various modifications to these embodiments will be readily apparent to those skilled in the art, and the generic principles defined herein may be applied to other embodiments without the use of the inventive faculty. Accordingly, the drawings and detailed description are to be regarded as illustrative in nature and not as restrictive. Thus, the present invention is not intended to be limited to the embodiments shown herein but is to be accorded the widest scope consistent with the principles and novel features disclosed herein, and as indicated by the appended claims.

What is claimed is:

1. A method for pacing transmission of data in a packet communication environment having a plurality of transmission stations inter-connectable via a link through a wide area network cloud, said method comprising the steps of:

determining a round trip time for a packet issued by a transmitter and acknowledged by a receiver;

determining number of data segments in a flow control window;

determining a window transmission time as the amount of time required to transmit the data segments of the flow control window;

computing an intersegment transmission interval based on the round trip time, window transmission time and number of segments per flow control window; and during a communication connection successively transmitting packets, each containing a data segment, with intersegment transmission intervals between selected packets.

2. The method of claim 1 wherein the round trip time determining step comprises the steps of:

sending a first packet to a remote transmission station;

receiving a second packet as an acknowledgment from the remote transmission station;

measuring a time delay between the first packet and the second packet; and computing the round trip time from the time delay.

3. The method of claim 1 wherein the intersegment transmission interval is randomly varied from its computed value during the transmitting step.

4. The method of claim 1 wherein the round trip time determining step is effected only once in conjunction with a single connection.

5. The method according to claim 1 wherein said intersegment transmission interval establishes a delay bound for scheduling of packets for transmission.

6. The method of claim 1 including a further step of recomputing the intersegment transmission interval upon a change of any one of round trip time, window transmission time and number of segments per window.

7. The method according to claim 1 wherein any one of said determining steps is effected prior to said first transmitting step.

8. The method according to claim 1 wherein said round trip time (RTT) determining step includes computation based on an arbitrary rate (AR) according to the relation: (RTT)=(WB)/(AR), where (WB) is number of bits in a flow control window, in order to compute said intersegment transmission interval.

9. The method of claim 1 wherein said intersegment transmission interval computing step comprises a computation according to the relation:

$$ITI=(RTT-WTT)/(NSW-1)$$

where

RTT is round trip time,

WTT is window transmission time,

NSW is number of segments per window,

RTT>WTT, and

NSW>1.

10. A method for pacing transmission of data in a packet communication environment having a plurality of transmission stations inter-connectable via a link through a wide area network cloud, said method comprising the steps of:

determining a round trip time for a packet issued by a transmitter and acknowledged by a receiver;

determining number of data segments in a flow control window;

determining a window transmission time as the amount of time required to transmit the data segments of the flow control window;

computing an intersegment transmission interval based on the round trip time, window transmission time and number of segments per flow control window; and during a communication connection, successively transmitting packets, each containing an acknowledgment of receipt of data, with intersegment transmission intervals between selected packets.

11. The method of claim 10 wherein the round trip time determining step comprises the steps of:

sending a first packet to a remote transmission station;

receiving a second packet as an acknowledgment from the remote transmission station;

measuring a time delay between the first packet and the second packet; and computing the round trip time from the time delay.

12. The method of claim 10 wherein the intersegment transmission interval is randomly varied from its computed value during the transmitting step.

13. The method of claim 10 wherein the round trip time determining step is effected only once in conjunction with a single connection.

14. The method according to claim 10 wherein said intersegment transmission interval establishes a delay bound for scheduling of packets for transmission.

15. The method of claim 10 including a further step of recomputing the intersegment transmission interval upon a change of any one of round trip time, window transmission time and number of segments per window.

16. The method according to claim 10 wherein any one of said determining steps is effected prior to said first transmitting step.

17. The method according to claim 10 wherein said round trip time (RTT) determining step includes computation based on an arbitrary rate (AR) according to the relation: (RTT)=(WB)/(AR), where (WB) is number of bits in a flow control window, in order to compute said intersegment transmission interval.

18. The method according to claim 1 wherein said intersegment transmission internal computing step comprises a computation according to the relation:

$$ITI=(RTT-WTT)/(NSW-1)$$

where

RTT is round trip time,

WTT is window transmission time,

NSW is number of segments per window,

RTT>WTT, and

NSW>1.

* * * * *